J. B. WOOLSEY.
Seed Planter.
No. 44,762.
Patented Oct. 18, 1864.
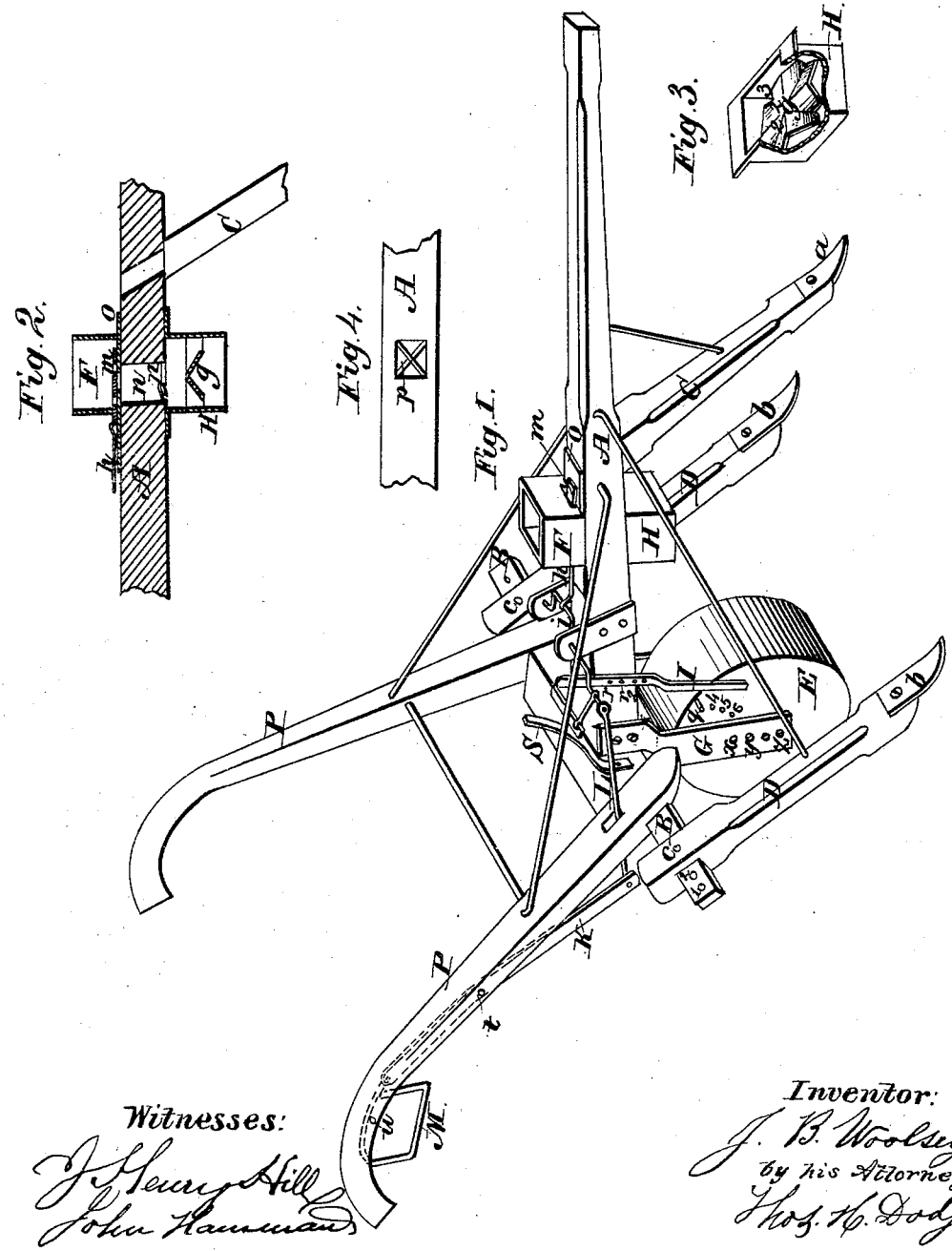
Witnesses:
J. Henry Hill
John Hammans
Inventor:
J. B. Woolsey
by his Attorney,
Thos. H. Dodge.

UNITED STATES PATENT OFFICE.

J. B. WOOLSEY, OF BLOOMFIELD, IOWA.

IMPROVEMENT IN CORN-PLANTERS.

Specification forming part of Letters Patent No. 44,762, dated October 18, 1864.

*To all whom it may concern:*

Be it known that I, J. B. WOOLSEY, of Bloomfield, in the county of Davis and State of Iowa, have invented certain new and useful Improvements in Corn-Planters; and I do hereby declare that the following is a full, clear, and exact description of the construction and operation of the same, reference being had to the accompanying drawings, in which—

Figure 1 represents a perspective view of said corn-planter. Fig. 2 represents a longitudinal vertical section through the seed-dropping device. Figs. 3 and 4 represent detached views, hereinafter to be referred to.

A represents the main beam of the corn-planter, and B the cross-beam, secured to the rear end of the former. The stock C is secured to the beam A, and its hoe $a$ opens the furrow into which the corn is to be dropped.

D represents the stocks to which the hoes $b$ are secured, the latter serving the purpose of covering the furrow after the seed has been deposited therein. The stocks D are secured to the beam B by means of the bolt $c$, and can be adjusted on said beam and secured in any desired position by having the holes 1, 2, &c., on the beam B, through either of which the bolt $c$ can be passed.

The roller E, which presses the earth on the covered furrow, has its bearings in the standards G, which are secured to the main beam A. The height of the roller can be adjusted by providing the standards G with adjusting-holes $x$ $y$ $z$, &c., into either of which the axle-ends of the roller E can be inserted.

F represents the seed-cup or hopper for the reception of the corn to be planted. It is secured to the main beam A, and a seed-slide, $m$, provided with suitable seed-cells, is operated on the perforated plate $o$ and within the seed-cup to drop the seed at proper intervals through the seed-tube H, whence it falls into the furrow. In thus discharging the corn regularly through the seed-tube it is liable to drop into the furrow in bunches, whereby the plants in the hill grow so close together that it is difficult to thin them out. To obviate this I employ a scattering device within the seed-tube, which consists in a quadrangular cross-roof-shaped device, $g$, made of metal or wood. It is secured within the seed-tube H, and the corn which drops upon it rolls down the gutters 2 (represented in Fig. 3) and escapes downward through the apertures 3 in the angles of the seed-tube. The corn thus drops down at the corners only of the seed-tube H, and is deposited in the hill in four separate points, whereby the bunching of the corn is effectually prevented.

$p$ represents cross-wires, secured within the seed-passage $n$ in the beam A. They may be used in place of the scattering device above described, or in combination therewith, and for the same purpose, and when used without the device they prevent the grain from lodging in the hill in bunches, but do not discharge it at four separate points, but tend to scatter it irregularly.

The seed-slide is operated by means of the pitman $h$ and crank $i$, the latter being operated automatically by the machine or by hand, at the option of the operator. When operated by the machine the pin $q$ on the side of the wheel E strikes the lever I, which is pivoted at $r$ to the beam A, and the upper bent end of said lever is connected with the crank-pin of crank $i$, and when said upper end has been forced to the rear by the action of the pin $q$ it strikes the spring $s$, which throws it foward as soon as the pin $q$ has passed the lower arm of said lever.

The action of the lever I can be regulated by adjusting the pin $q$ nearer to or farther from the center of the wheel E by means of the holes 4 5 6, &c.; also by changing the fulcrum of the lever I by means of the adjusting-holes, 7 8 9, &c.

The seed-slide is operated by hand by means of the lever K, which is pivoted at $t$ to one of the handles P of the machine, and the connecting-rod L, which actuates the crank $i$, is secured to the lower end of said lever. The upper end of the lever K is hinged to the handle M, which is set loosely in a recess in the handle P of the machine, and is supported therein by means of a pin, $u$. By pulling the handle M to the front or to the rear the seed-slide $m$ is operated, and this can be done by the operator without releasing the machine-handle and while he guides the machine in the performance of the work.

This corn-planter can also be used as a cultivator by simply disconnecting the crank from the levers or rods which operate it, and whereby the operation of the seed-slide is arrested.

Having thus fully described the nature of my invention, what I claim herein as new, and desire to secure by Letters Patent, is—

1. In combination with the seed-dropping device, the adjustable lever I and the hand-lever M, when constructed, arranged, and connected with the working parts of the machine to operate the seed-slide by machine or by hand, as herein shown and described.

2. In combination with the seed-dropping apparatus, the cross-roof-shaped scattering device g, substantially as and for the purpose herein described.

J. B. WOOLSEY.

Witnesses:
 A. HART,
 JOSEPH VON ACHEN.